Nov. 28, 1933. W. H. BASELT 1,936,897
CLASP BRAKE FOR MOTOR TRUCKS
Filed Sept. 24, 1931 2 Sheets-Sheet 2
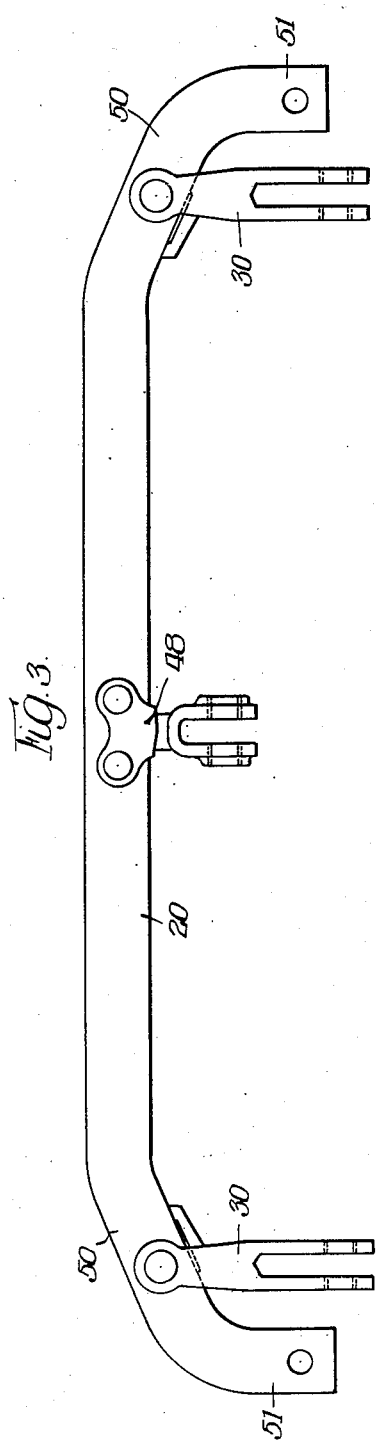
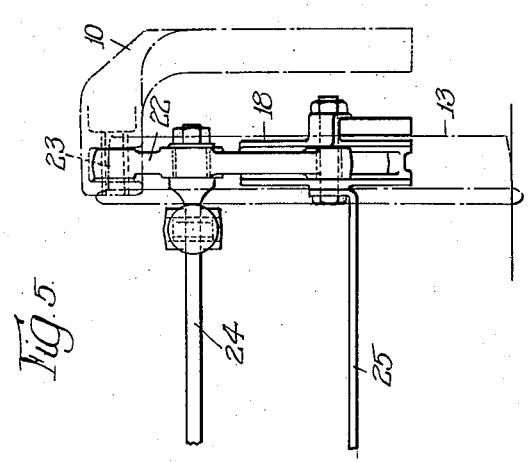
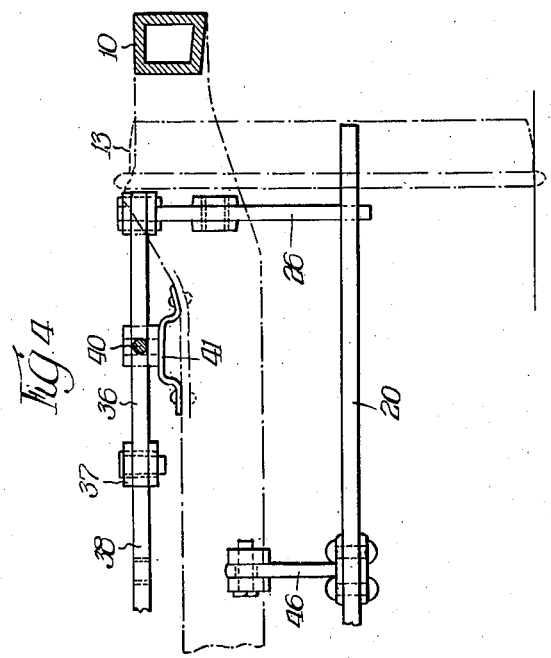
Inventor:
Walter H Baselt,
By Wilkinson, Huxley, Byron & Knight
Attys.

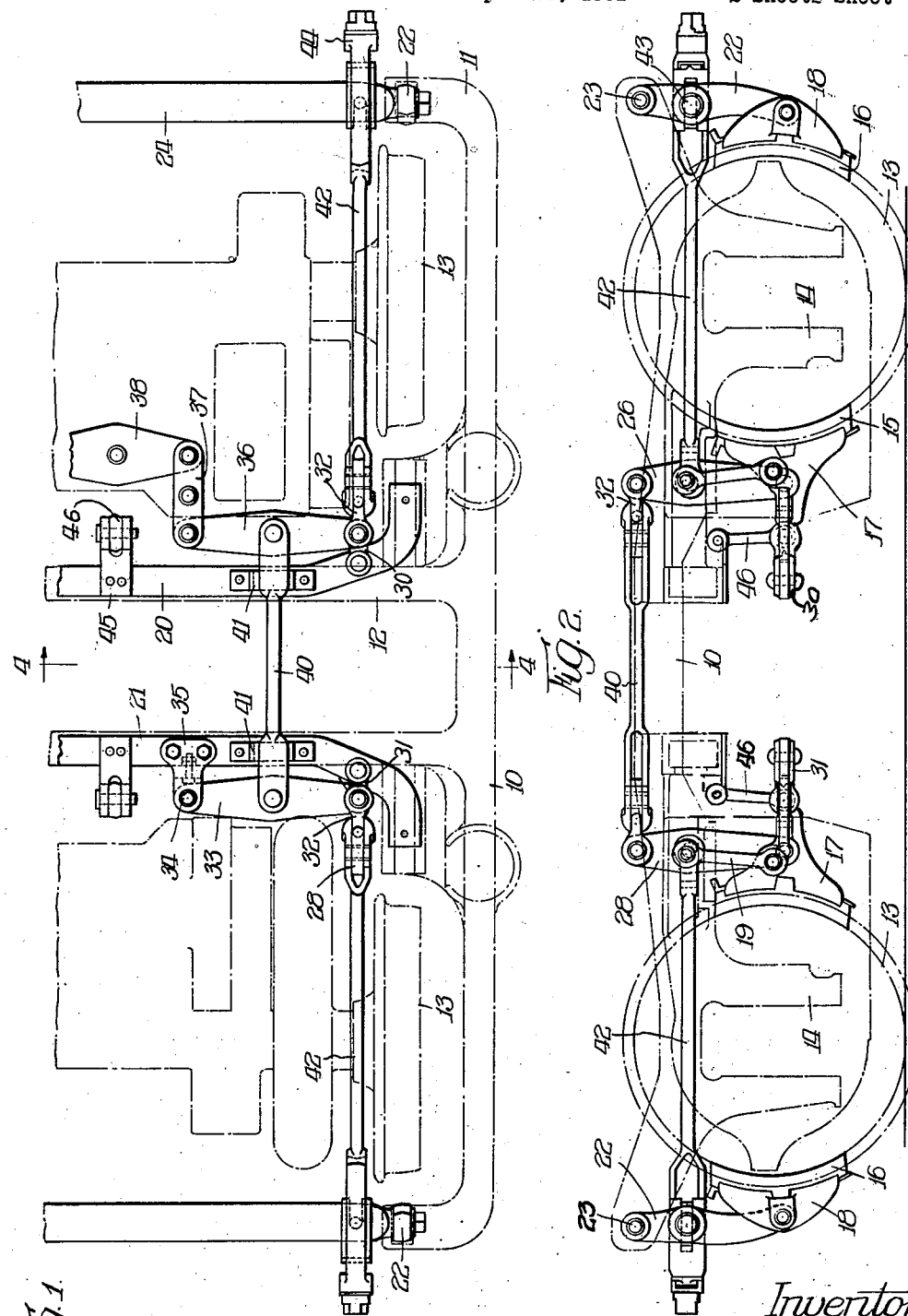

Patented Nov. 28, 1933

1,936,897

UNITED STATES PATENT OFFICE 1,936,897

CLASP BRAKE FOR MOTOR TRUCKS

Walter H. Baselt, Flossmoor, Ill., assignor to American Steel Foundries, Chicago, Ill., a corporation of New Jersey Application September 24, 1931
Serial No. 564,731

5 Claims. (Cl. 188—56)

The invention relates to brake rigging for railway cars and has reference more particularly to a clasp type of rigging for railway motor trucks.

An object of the invention is to provide brake rigging of the type wherein brake shoes and brake beams are applied to both sides of each pair of wheels, and which, by reason of a novel arrangement of parts, will result in sufficient clearance between the rigging and the electric motors, generators and other equipment.

A further object is to provide brake rigging of the type described with an improved construction of brake beam and fulcrum member through which certain of the brake shoes are applied to the wheels characterized by arcuate ends on the beams designed so as to prevent interference with the motor equipment.

A still further object is to provide brake rigging which will be simple in construction and adapted to meet the requirements for successful operation.

With these and various other objects in view, the invention may consist of certain novel features of construction and operation as will be more fully described and particularly pointed out in the specification, drawings and claims appended hereto.

In the drawings which illustrate an embodiment of the device and wherein like reference characters are used to designate like parts—

Figure 1 is a fargmentary top plan view of one form of clasp type of brake rigging embodying the improved construction of the present invention;

Figure 2 is a longitudinal elevational view of the same;

Figure 3 is a detail top plan view of one of the brake beams, the same having fulcrum members secured thereto;

Figure 4 is a sectional view taken substantially along line 4—4 of Figure 1, and Figure 5 is an end elevation of the arrangement shown in Figure 1.

The improved construction is shown as applied to a four-wheel truck comprising a truck frame 10 having arcuate end members or brackets 11 and transverse center members or transoms 12 and car wheels 13 journaled in the frame through suitable journal boxes (not shown) by means of depending pedestals or journaling members 14. The wheels on each side of the truck frame are engaged by brake shoes 15 and 16, designated as the inside and outside shoes, respectively, brake heads 17 engaging shoes 15, while brake heads 18 engage the outside shoes 16. The former are in turn suspended from the frame by hangers 19 and are secured to the outer end of transversely extending brake beams 20 and 21, as shown in Figure 1. While the above and following description pertains to only one side of the truck it is to be understood that the structure is duplicated on the other side of the truck to form a double set of brake levers and connections.

The outside brake heads 18 are pivotally secured to dead truck levers 22 which have pivotal engagement with the frame as at 23. Brake beams 24, Figures 1 and 5, are employed, extending transversely of the frame for connecting the dead truck levers 22 on both sides of the frame, the connections being at a point on the dead truck levers intermediate the ends of the same. Spacing or tie members 25 are provided, extending transversely and substantially parallel with the beams 24 and serve to join the brake heads 18 on both sides of the frame so that the shoes are maintained in alignment with the tread of the car wheels.

Live truck levers are located to the inside of the car wheels at both sides of the truck and designated 26 and 28, Figure 2. The live truck lever 26 is pivotally connected at its lower end to a fulcrum member 30 secured to the inside beam 20, while the lever 28 is pivotally connected in a similar manner to the inside brake beam 21 by the fulcrum member 31 suitably secured adjacent the ends of beam 21. The upper end of the live lever 28 is pivotally connected through the clevice 32 to a dead horizontal lever 33 fulcrumed at 34 to the bracket 35 secured to the transverse member 12. The live lever 26 is connected through a similar clevice 32 to a live horizontal lever 36, which in turn has connection by means of a link 37 to an end of a floating or equalizing lever 38, which is correspondingly connected at its opposite end to the brake system on the opposite side of the truck. The horizontal levers 33 and 36 are connected intermediate their ends by a tie rod 40 which rests on brackets 41, Figure 4, secured to the transverse members 12. Connecting rods 42 are employed to connect the live truck levers 26 and 28, respectively, with their corresponding dead truck levers 22 and have connection with the latter intermediate their ends, as at 43, so as to provide an adjustable connection through means of the slack adjuster 44 for taking up slack in the brake rigging. Through the rods 42, levers 26 and 28 and fulcrum members 30 and 31 the inside brake beams and their corresponding brake heads 17 are connected into the brake rigging and thus with the outside brake heads 18.

In order to prevent the inside beams from tilting and for supporting the weight of the truck levers thereon a midpoint support is provided, which consists of a bracket 45 secured to the transverse member 12 and having pivotally connected thereto a hanger 46 in turn pivotally connected to the beam by means of the fulcrum member 48 secured thereto.

A feature of the present invention is the provision of a special form of inside brake beams which, as shown in Figure 3, are provided with arcuate ends 50 terminating in projections 51 extending substantially at right angles to the body of the beam. The particular curvature provided on the ends of the beams serves to provide sufficient clearance between the members and the motor equipment carried by the truck and so prevents interference between the rigging and the motor equipment. The location of the body portion of the inside brake beams, due to the arcuate ends required the addition to the beams of fulcrum members 30 secured adjacent the ends to the beam 20, Figure 3, similar fulcrum members 31 being secured to the inside beam 21. By means of the fulcrum members the live truck levers are pivotally connected to the beams, the construction also permitting free actuation of the rigging without interfering with any of the equipment carried by the truck. For operation of the brakes a pressure cylinder, not shown, has suitable connection to the floating or equalizing lever 38. Upon actuation of the live levers 36, located on both sides of the truck, respectively, each set of truck levers is brought into operation to apply the brake shoes 15 and 16 to the car wheels.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. A brake beam having the ends thereof offset to dispose a portion of said ends substantially normal to said beam, means provided in said ends whereby brake shoes may be rigidly secured to said ends, fulcrum members disposed adjacent and substantially parallel to said ends, and a fulcrum member disposed intermediate said first named fulcrum members.

2. A brake beam having the ends thereof offset to dispose a portion of said ends substantially normal to said beam, means provided in said ends whereby brake shoes may be rigidly secured to said ends, fulcrum members disposed adjacent and substantially parallel to said ends, and a fulcrum member disposed intermediate said first named fulcrum members and substantially parallel thereto.

3. In a brake arrangement, the combination of spaced wheel and axle assemblies, a truck frame including spaced side frames and connecting transoms, said side frames being provided with journal means having cooperative engagement with the journal ends of said wheel and axle assemblies, brake heads having brake shoes thereon disposed on each side of the wheels of said wheel and axle assemblies, the end brake heads being supported by dead truck levers pivotally supported on the adjacent side frame, the inner of said brake heads being supported by a hanger pivotally mounted on the adjacent side frame, a brake beam having the ends thereof fixedly secured to the inner of said brake heads, said ends being offset from the intermediate body portion of said beam, said intermediate body portion being substantially in vertical alignment with the adjacent transoms whereby the span between said transom and the end of the truck is substantially unrestricted by said brake arrangement, a fulcrum member pivotally connecting said brake beam to said transoms intermediate the wheels whereby said beam has free swinging movement to maintain the shoes concentric with the adjacent wheel in brake applied position, a truck lever connected to said brake beam outside the periphery of the wheels and inwardly of said inner brake head, a connection between said truck levers, and operating means for said truck levers disposed above said truck frame.

4. In a brake arrangement, the combination of spaced wheel and axle assemblies, a truck frame including spaced side frames and connecting transoms, said side frames being provided with journal means having cooperative engagement with the journal ends of said wheel and axle assemblies, brake heads having brake shoes thereon disposed on each side of the wheels of said wheel and axle assemblies, the end brake heads being supported by dead truck levers pivotally supported on the adjacent side frame, the inner of said brake heads being supported by a hanger pivotally mounted on the adjacent side frame, a brake beam having the ends thereof fixedly secured to the inner of said brake heads, said ends being offset from the intermediate portion of said beam, said intermediate body portion being substantially in vertical alignment with the adjacent transoms whereby the span between said transom and the end of the truck is substantially unrestricted by said brake arrangement, a fulcrum member pivotally connecting said brake beam to said transoms intermediate the wheels whereby said beam has free swinging movement to maintain the shoes concentric with the adjacent wheel in brake applied position, a truck lever connected to said brake beam outside the periphery of the wheels and inwardly of said inner brake head and said wheels, a connection between said truck levers above the axle and inwardly of the wheels, and operating means for said truck levers disposed above said truck frame.

5. In a brake rigging for railway trucks, the combination of a pair of wheels, brake heads having brake shoes thereon disposed at opposite sides of each wheel, operating connections between the opposite brake heads including pull rods and truck levers located inside of said wheels, and a brake beam rigidly connecting the brake heads at one side of both wheels, the intermediate portion of said brake beam being offset from its connection to said brake heads in a direction away from said wheels, and means pivotally supporting each end and the intermediate portion of said beam, whereby said beam has free swinging movement to maintain the shoes concentric with the adjacent wheel in brake applied position.

WALTER H. BASELT.